(12) United States Patent
Kawamura

(10) Patent No.: US 7,007,124 B2
(45) Date of Patent: Feb. 28, 2006

(54) IMAGE PROCESSING SYSTEM, AND SEMICONDUCTOR DEVICE AND DIGITAL STILL CAMERA APPARATUS USING IMAGE PROCESSING SYSTEM

(75) Inventor: Hideaki Kawamura, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 1012 days.

(21) Appl. No.: 09/898,062

(22) Filed: Jul. 5, 2001

(65) Prior Publication Data

US 2002/0003574 A1    Jan. 10, 2002

(30) Foreign Application Priority Data

Jul. 5, 2000    (JP) ............................. 2000-204416

(51) Int. Cl.
*G06F 13/14* (2006.01)
*G06F 13/362* (2006.01)

(52) U.S. Cl. ...................................... 710/244; 710/113
(58) Field of Classification Search ................ 710/244, 710/113; 713/502
See application file for complete search history.

(56) References Cited

U.S. PATENT DOCUMENTS

| | | | | |
|---|---|---|---|---|
| 5,517,325 A | * | 5/1996 | Shimatani | 358/444 |
| 5,930,488 A | * | 7/1999 | Mitsuishi | 710/306 |
| 6,320,573 B1 | * | 11/2001 | Stephenson | 345/211 |
| 2003/0142219 A1 | * | 7/2003 | McGarvey et al. | 348/222.1 |

FOREIGN PATENT DOCUMENTS

| | | |
|---|---|---|
| JP | 56-27429 A | 3/1981 |
| JP | 62-24348 A | 2/1987 |
| JP | 63-29867 A | 2/1988 |
| JP | 63-261451 A | 10/1988 |
| JP | 4-7773 A | 1/1992 |
| JP | 8-171528 A | 7/1996 |
| JP | A11120123 | 4/1999 |

* cited by examiner

*Primary Examiner*—Rehana Perveen
*Assistant Examiner*—Jeremy S. Cerullo
(74) *Attorney, Agent, or Firm*—Birch, Stewart, Kolasch & Birch, LLP

(57) ABSTRACT

A data processing system includes: at least one function module connected to a single system bus; a data transfer controller which outputs a first bus use permission request signal based on a data transfer request signal output from the at least one function module; a central processing unit connected to the system bus which outputs a second bus use permission request signal; an arbitration controller for determining, based on the first and second bus use permission request signals, which of the data transfer controller and the central processing unit should obtain a permission to use the system bus; a section for setting a first data amount which can be continuously transferred by the at least one function module; a section for suspending an output of the first bus use permission request signal to the arbitration controller for at least one clock cycle after a data transfer by the at least one function module is completed; and a section for giving the permission to use the system bus to one of the data transfer controller and the central processing unit in such a manner that the data transfer controller has a priority over the central processing unit during a period when the first bus use permission request signal is being issued.

13 Claims, 14 Drawing Sheets

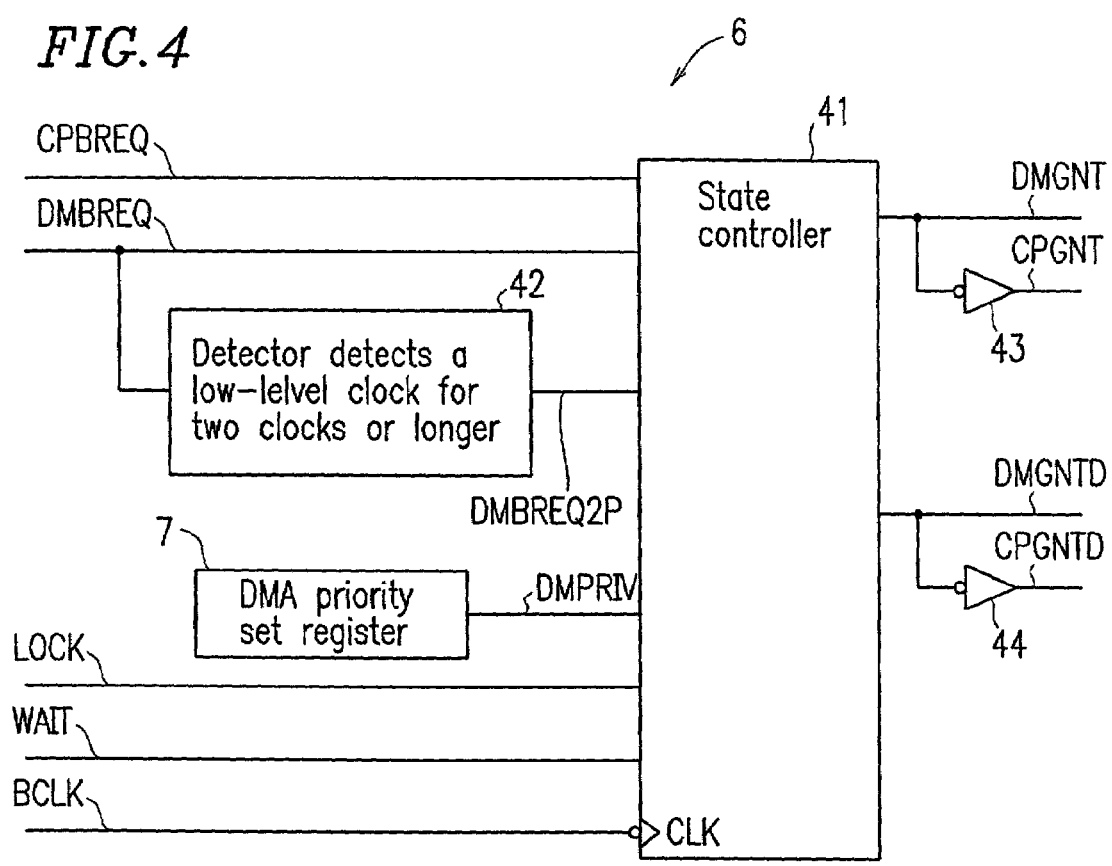

FIG.5

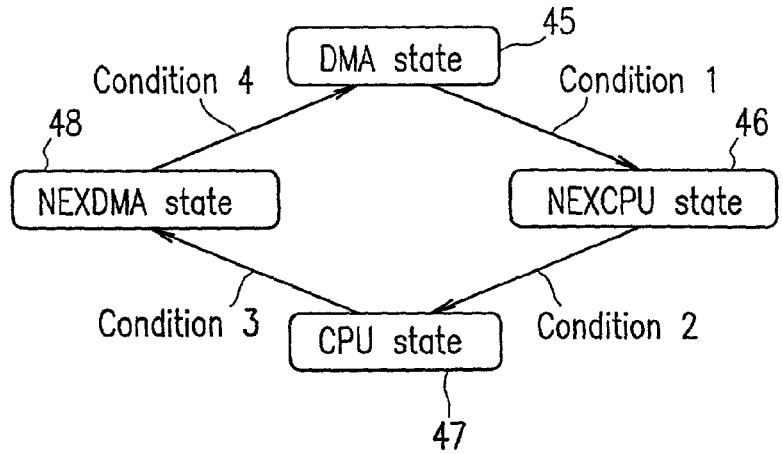

State transition condition
(Transition occurs when each condition is satisfied)

| |
|---|
| Condition 1: CPBREQ & ((!DMPRIV & !DMBREQ) or (DMPRIV & DMBREQ2P)) |
| Condition 2: !WAIT (not in WAIT state) |
| Condition 3: DMBREQ |
| Condition 4: !(LOCK & CPBREQ) & !WAIT (not LOCKed and not in WAIT state) |

State Definition
(output levels of signals for each state)

| |
|---|
| DMA    : DMGNT = High, DMGNTD = High |
| NEXCPU: DMGNT = Low,  DMGNTD = High <br> (Bus use permission is transferred to CPU in next cycle) |
| CPU    : DMGNT = Low,  DMGNTD = Low |
| NEXDMA: DMGNT = High, DMGNTD = Low <br> (Bus use permission is transferred to DMAC in next cycle) |

[NOTE] Meanings of above symbols are as follows:
    & · · · logical multiplication
    or · · · logical sum
    ! · · · inversion of logic (1) HOLD
(bus use permission request signal)

(2) HOLDACK
(bus use permission signal)

(A) DMA transfer time
(CPU or DMAC which has bus use permission uses bus for data transfer)

(B) Bus use permission request minimum time
(time consumed until a bus use permission can be requested after the data transfer during time (A) is completed)

IMAGE PROCESSING SYSTEM, AND SEMICONDUCTOR DEVICE AND DIGITAL STILL CAMERA APPARATUS USING IMAGE PROCESSING SYSTEM

BACKGROUND OF THE INVENTION

1. Field of the Invention

The present invention relates to an image processing system which has a bus-control function for transferring a large amount of data, such as an image, a character, etc., through a single data bus.

2. Description of the Related Art

Japanese Laid-Open Publication No. 11-120123 discloses a method for controlling a bus in a system where a single common bus is shared by a CPU and function modules which transfer data based on a Direct Memory Access (DMA) transfer method. FIG. 13 is a block diagram showing a bus control system 2000 which uses this bus control method. FIG. 14 is a timing chart showing signals output from the system shown in FIG. 13. The system of FIG. 13 for controlling a bus includes: a bus use permission request minimum time setting register 110 in which a minimum time consumed since a direct memory access controller (DMAC: not shown) or a CPU (not shown) issues a request for a permission to use a bus (hereinafter, referred to as "bus use permission request") until the bus control system 2000 outputs a bus use permission request is set for each of the direct memory access controller and the CPU: a counter 111 which operates based on a clock of the CPU (CPUCLK); a DMA time setting register 114 for setting a DMA transfer time; and a counter 115 which operates based on a signal indicating the end of a data transfer cycle signal (RDY).

The bus use permission request minimum time setting register 110 outputs to the counter 111 a signal which indicates a set value of the minimum time consumed until a bus use permission is requested. The counter 111 counts the number of cycles of CPUCLK. When the counted number reaches the set value indicated by the signal output from the bus use permission request minimum time setting register 110, the counter 111 outputs a high-level signal to a HOLD request mask 112. The HOLD request mask 112 receives an output signal from the counter 111. When the output signal is at a low level, the HOLD request mask 112 outputs a signal to an AND gate 113 to turn the AND gate 113 off for a predetermined time period after a DMA transfer operation using the bus is completed. Such an arrangement is made for preventing a bus use permission request signal HOLD from being issued after the DMA transfer operation is completed.

In the meantime, the DMA time setting register 114 outputs to the counter 115 a signal which indicates a set value of a DMA transfer time (i.e., "bus cycle value"). The counter 115 counts an RDY signal which indicates the end of a bus cycle. When the counted number reaches the set value indicated by the signal output from the DMA time setting register 114, i.e., when the counted number reaches the bus cycle value, the counter 115 outputs a high-level signal to a reset terminal R of a flip-flop circuit 116. A set terminal S of the flip-flop circuit 116 receives a HOLD ON condition signal. The AND gate 113 logically synthesizes an output signal from the flip-flop circuit 116 with an output signal from the HOLD request mask 112 to output a bus use permission request signal HOLD.

Thus, based on a comparison result of the set values set in the bus use permission request minimum time setting register 110 and the DMA time setting register 114 and respective counted values in the subsequent counters 111 and 115, the bus control system 2000 switches its operation between two different modes: a mode where the system 2000 outputs a HOLD ON condition signal, which is an internal bus request signal, as a bus use permission request signal HOLD from the AND gate 113; and a mode where the bus use permission request signal HOLD is masked by the HOLD request mask 112 for a predetermined time period. Then, each of the CPU and the DMAC changes the set values in the bus use permission request minimum time setting register 110 and the DMA time setting register 114 based on the comparison result of the previous set values set in the bus use permission request minimum time setting register 110 and the DMA time setting register 114. With such an arrangement, as shown in FIG. 14, each of the CPU and the DMACs sets: a DMA transfer time (A), which is a maximum time during which the CPU or DMAC can use the bus for data transfer after the CPU or DMAC obtains a bus use permission; and a bus use permission request minimum time (B), which is a minimum time consumed until a bus use permission can be requested after a DMA transfer operation is completed. By adjusting these times (A) and (B), the bus occupation ratio between the CPU and the DMAC is properly adjusted. In this example, a value corresponding to the bus use permission request minimum time (B) is set in the bus use permission request minimum time setting register 110, and a value corresponding to the DMA transfer time (A) is set in the DMA time setting register 114. In the timing chart shown in FIG. 14, after the DMAC starts transmitting the bus use permission request signal HOLD, and a bus use permission signal HOLDACK is returned to the DMAC, during the DMA transfer time (A), the bus control system 2000 continues to transmit the signal HOLD, thereby continuing to request a permission to use the bus. After the DMA transfer time (A) has elapsed, the request signal is masked by the HOLD request mask 112. Then, after the bus use permission request minimum time (B) has elapsed, the mask is deactivated again, and the bus control system 2000 resumes requesting the permission to use the bus.

The above bus control system 2000 is provided to each of a CPU and DMACs, and set values in registers for each of the CPU and DMACs are adjusted, whereby the bus occupation ratio among the CPU and DMACs is adjusted.

In this bus control method, a mask period during which each of the CPU and DMACs does not issue a bus use permission request is provided. By adjusting the length of this mask period, the frequency at which each of the CPU and DMACs uses a bus (bus occupation ratio) is adjusted. In such a structure, a time period during which neither of the CPU and DMACs cannot use the bus occurs although the bus is unoccupied. Referring to FIG. 14, during the bus use permission request minimum time (B) when a bus use permission request is masked so as not to be output, the other DMACs and/or the CPU connected to the common bus detect the interruption of the bus use permission request. Such a detection operation requires a sufficiently long time, and further, a sufficiently long time period is required after the detection operation is completed until the other DMACs and/or the CPU obtains a permission to use the bus. Furthermore, once the times (A) and (B) have been set, these set times (A) and (B) are effective until a next modification. Thus, even when only one DMAC (or only the CPU) occupy the bus for data transfer, the DMAC (or CPU) cannot use the bus during the bus use permission request minimum time (B).

As described above, the time set in the DMA time setting register 114 (DMA transfer time (A)) is a maximum time during which the CPU or DMAC can continuously occupy the bus for data transfer. However, in some bus arbitration methods, when a bus use permission is requested by a CPU or DMAC having a higher priority, the bus use permission can be handed over to that prior CPU or DMAC. For example, when a CPU or DMAC transfers data to an SDRAM, or the like, i.e., to a device which requires a short overhead time at the beginning of an access but does not require any overhead time for a subsequent access to addresses within the same page, if the bus use permission is handed over from one of the CPU or DMACs to another during the DMA transfer time (A) as described above, the number of accesses (the number of data transfer operations) is increased by the number of times that a hand-over of the bus use permission is made, and accordingly, the total overhead time is increased. As a result, the data transfer efficiency is decreased by the amount of increased total overhead time.

Thus, it is impossible for the above conventional bus control method to achieve a maximum efficiency of the common bus and is therefore not suitable to a system including a function module which performs high-speed image processing based on a DMA transfer method for achieving high-speed image processing.

FIG. 12 is a block diagram showing a high-speed image processing system S3 based on a conventional bus control method. The image processing system S3 includes: a DMAC 100 which transfers data based on a DMA transfer method; a CPU & i/f 102 which transfers a program command and data for system control; function modules 105, 106, and 107 each of which requests a transfer of data; and an arbitration controller 101 for selectively giving a permission to use the bus in response to bus use permission requests from the DMAC 100 and the CPU & i/f 102.

When reading data stored in an external memory 109, such as a CPU program, etc., the CPU & i/f 102 reads the data from the external memory 109 through an external connection terminal for a system bus B1 (terminal B3), an external memory controller 104, and the system bus B1, but not through the bus B2 which is used exclusively for image data (hereinafter, "image data bus B2"). The CPU & i/f 102 transmits a bus use permission request signal CPBREQ to the arbitration controller 101 only when attempting to refer to image data stored in an external memory 108.

The function modules 105, 106, and 107 issue data transfer request signals DREQ-A, DREQ-B, and DREQ-C, respectively, to the DMAC 100. The DMAC 100 receives the data transfer request signals DREQ-A, DREQ-B, and DREQ-C to determine an order of priority for data transfer among the function modules 105, 106, and 107, and transmits a bus use permission request signal DMBREQ to the arbitration controller 101.

In response to the bus use permission request signal DMBREQ from the DMAC 100 and the bus use permission request signal CPBREQ from the CPU & i/f 102, the arbitration controller 101 selectively outputs to the DMAC 100 or the CPU & i/f 102 a signal for permitting to use the image data bus B2, thereby controlling the bus occupation ratio between the DMAC 100 and the CPU & i/f 102. For example, when the DMAC 100 is permitted to use the image data bus B2, image data is transferred to any of the function modules 105, 106, and 107, based on the previously-determined order of priority, through an external connection terminal for the image data bus B2 (terminal B4), an external memory controller 103, and the image data bus B2.

Data processed by the function modules 105, 106, 107, or the CPU & i/f 102 is written in the external memory 108 according to a bus control procedure similar to the above-described procedure.

As described above, in order to achieve a high-speed image processing system based on the conventional bus control method, it is necessary to structure an image processing system S3 including two data buses (the image data bus B2 and the system bus B1) and to connect the two exclusively-used external memories 108 and 109 to the image data bus B2 and the system bus B1, respectively. Thus, when the image processing system S3 is realized based on a large scale integration (LSI) technique, for example, two connection lines are required between the system S3 and the memories 108 and 109. This influences a package size, and furthermore, increases the amount of electric power consumed in an I/O buffer.

SUMMARY OF THE INVENTION

According to one aspect of the present invention, a data processing system, comprising: at least one function module connected to a single system bus; a data transfer controller which outputs a first bus use permission request signal based on a data transfer request signal output from the at least one function module; a central processing unit connected to the system bus which outputs a second bus use permission request signal; an arbitration controller for determining, based on the first and second bus use permission request signals, which of the data transfer controller and the central processing unit should obtain a permission to use the system bus; a section for setting a first data amount which can be continuously transferred by the at least one function module; a section for suspending an output of the first bus use permission request signal to the arbitration controller for at least one clock cycle after a data transfer by the at least one function module is completed; and a section for giving the permission to use the system bus to one of the data transfer controller and the central processing unit in such a manner that the data transfer controller has a priority over the central processing unit during a period when the first bus use permission request signal is being issued.

In one embodiment of the present invention, the at least one function module is a plurality of function modules; and in the case where among the plurality of function modules, a function module having a higher priority of the permission to use the system bus than the central processing unit is issuing the data transfer request signal, the output of the first bus use permission request signal to the arbitration controller is not suspended even after a data transfer by one of the plurality of function modules is completed.

In another embodiment of the present invention, after a data transfer by the at least one function module is completed and the output of the first bus use permission request signal to the arbitration controller is then suspended for at least one clock cycle, in the case where the output of the first bus use permission request signal to the arbitration controller is further suspended for another one or more clock cycles, the permission to use the system bus is given to the central processing unit based on the second bus use permission request signal.

In still another embodiment of the present invention, the data processing system further includes a section for setting a second data amount which can be continuously transferred by the central processing unit, wherein in the case where the second data amount is not equal to a predetermined amount, the central processing unit continues to execute data transfer even when the data transfer controller is requesting the permission to use the system bus during the data transfer by the central processing unit.

According to another aspect of the present invention, a semiconductor device includes the data processing system of claim 1.

According to still another aspect of the present invention, a digital camera apparatus includes the semiconductor device of claim 5.

According to still another aspect of the present invention, a semiconductor device includes the data processing system of claim 2.

According to still another aspect of the present invention, a digital camera apparatus includes the semiconductor device of claim 7.

According to still another aspect of the present invention, a semiconductor device includes the data processing system of claim 3.

According to still another aspect of the present invention, a digital camera apparatus includes the semiconductor device of claim 9.

According to still another aspect of the present invention, a semiconductor device includes the data processing system of claim 4.

According to still another aspect of the present invention, a digital camera apparatus includes the semiconductor device of claim 11.

Thus, the invention described herein makes possible the advantages of (1) providing an image processing system which can achieve a maximum transfer efficiency of a data bus while reducing the size and consumed electric power thereof, and (2) providing a digital still camera apparatus using the image processing system.

These and other advantages of the present invention will become apparent to those skilled in the art upon reading and understanding the following detailed description with reference to the accompanying figures.

BRIEF DESCRIPTION OF THE DRAWINGS

FIG. 4 shows a structure of the arbitration controller 6 in the image processing system S1 shown in FIG. 1 according to the present invention.

FIG. 5 illustrates an example of an operation of the state controller 41.

DESCRIPTION OF THE PREFERRED EMBODIMENTS

Hereinafter, an embodiment of the present invention will be described with reference to the drawings.

Figure 1:
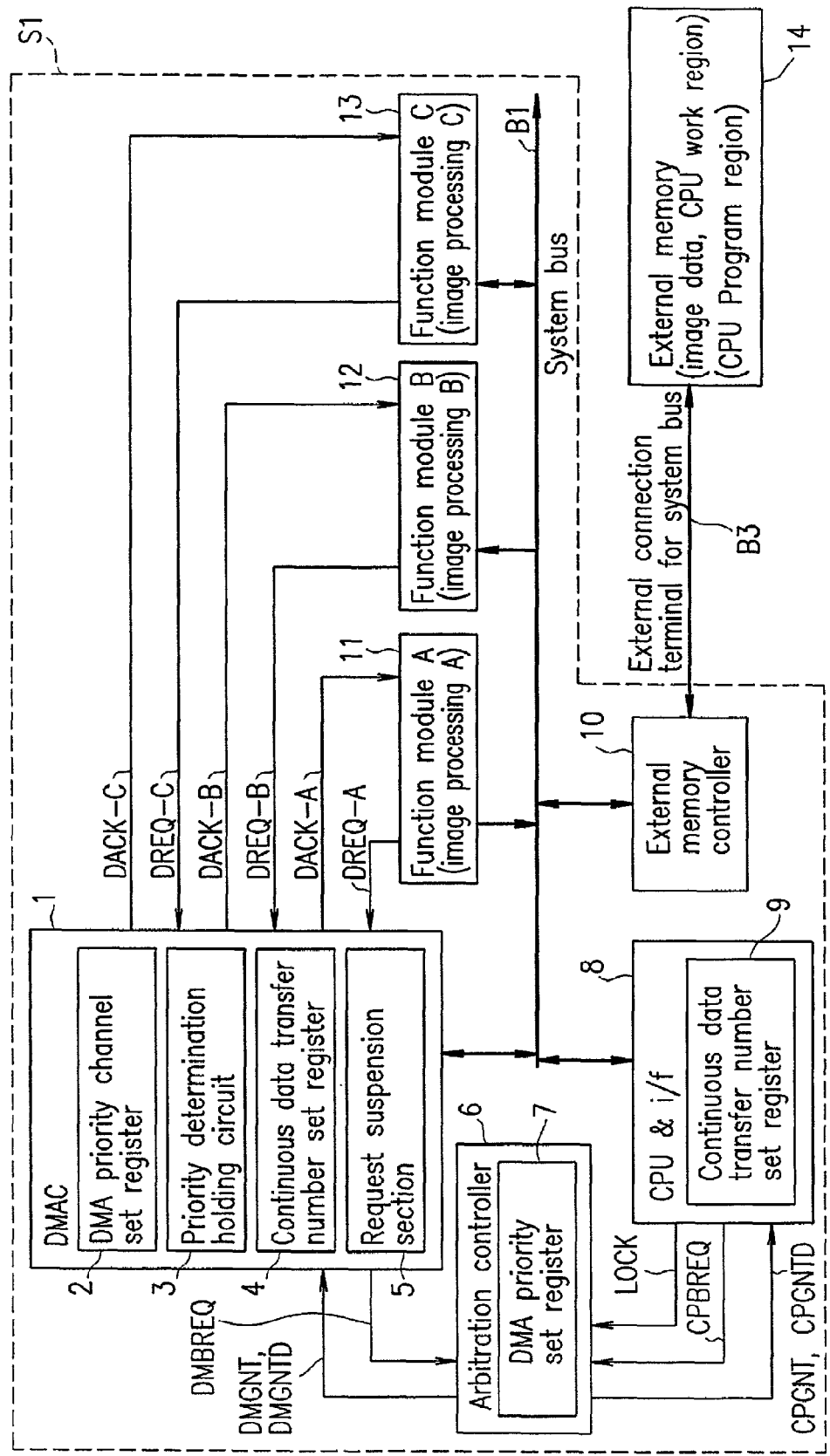
FIG. 1 is a block diagram of an image processing system according to an embodiment of the present invention.

FIG. 1 is a block diagram of an image processing system S1 according to an embodiment of the present invention. The image processing system S1 includes: a DMAC 1 which transfers data based on a DMA transfer method; a CPU & i/f 8 which transfers a program command for system control and data for control; function modules 11, 12, and 13 each of which requests a transfer of data; and an arbitration controller 6 for selectively giving a permission to use the bus in response to bus use permission requests from the DMAC 1 and the CPU & i/f 8. In this example, the arbitration controller 6 gives a request from the DMAC 1 priority over a request from the CPU & i/f 8. Furthermore, the image processing system S1 includes a single system bus B1 which is used for transferring both image data and data, such as a CPU program or the like.

The function modules 11, 12, and 13 issue data transfer request signals DREQ-A, DREQ-B, and DREQ-C, respectively, to the DMAC 1 for reading image data stored in an external memory 14. The DMAC 1 receives, at a priority determination holding circuit 3, the data transfer request signals DREQ-A, DREQ-B, and DREQ-C to determine an order of priority for data transfer among the function modules 11, 12, and 13, and outputs a bus use permission request signal DMBREQ to the arbitration controller 6.

On the other hand, the CPU & i/f 8 issues a bus use permission request signal CPBREQ to the arbitration controller 6 for transferring commands to execute a program and to control the system S1 and data used therefor.

The arbitration controller 6 has a DMA priority set register 7. In this example, in response to the bus use permission request signals DMBREQ and CPBREQ respectively from the DMAC 1 and the CPU & i/f 8, the arbitration controller 6 selectively gives to the DMAC 1 or the CPU & i/f 8 a permission to use the system bus B1 (bus use permission signal) in such a manner that the request from the DMAC 1 has a priority over the request from the CPU & i/f 8, thereby adjusting the bus occupation ratio between the DMAC 1 and the CPU & i/f 8.

When the DMAC 1 receives the bus use permission signal, image data is transferred from the external memory 14 through an external connection terminal for system bus (terminal B3), the external memory controller 10, and the system bus B1 to any of the function modules 11, 12, and 13 which is requesting a data transfer.

Alternatively, the CPU & i/f 8 receives the bus use permission signal, a command to execute a program and data used therefor are read out from the external memory 14 through the external connection terminal for system bus (terminal B3), the external memory controller 10, and the system bus B1 into the CPU & i/f 8.

The data processed in the any of the function modules 11, 12, and 13 or the CPU & i/f 8 is returned via the same route to and written in the external memory 14.

Figure 2:
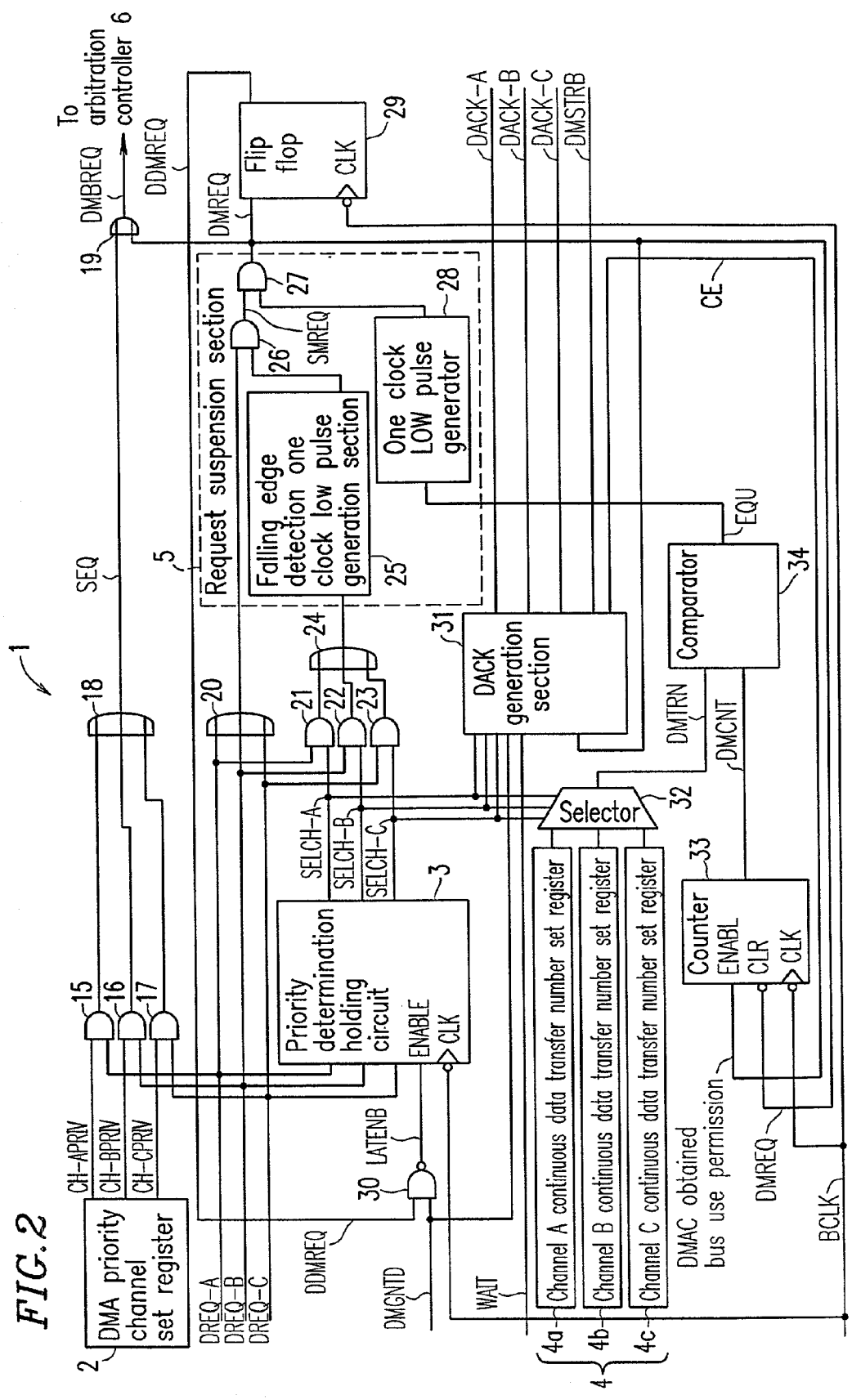
FIG. 2 shows an example of the DMAC 1 in an image processing system Si shown in FIG. 1 according to the present invention.

FIG. 2 shows an example of the DMAC 1 in the image processing system S1. In the example illustrated in FIGS. 1 and 2, the image processing system S1 includes three function modules 11, 12, and 13 each of which requests a continuous data transfer based on a DMA data transfer method in order to perform image processing (image processing A, image processing B, and image processing C). However, according to the present invention, the number of function modules is not limited to three but may be one, two, or four or more.

The DMAC 1 shown in FIG. 2 includes a DMA channel priority set register 2 in which a priority of channels connected to the function modules 11, 12, and 13 is set such that data transfer of the DMAC 1 is performed prior to that of the CPU & i/f 8; a priority determination holding circuit 3 for determining the order of priority of data transfer requests received from the function modules 11, 12, and 13 via respective channels connected thereto; a continuous data transfer number set register 4 in which the amount of data which can be continuously transferred by each of the function modules 11, 12, and 13 during a single data transfer operation is set; and a request suspension section 5 for suspending the supply of a bus use permission request signal from the DMAC 1 to the arbitration controller 6 for one clock cycle.

The continuous data transfer number set register 4 includes a Channel A continuous data transfer number set register 4a, a Channel B continuous data transfer number set register 4b, and a Channel C continuous data transfer number set register 4c. In the continuous data transfer number set register 4, the amount of data which can be continuously transferred by each of the function modules 11, 12, and 13 during a single data transfer operation (the number of times that each of the function modules 11, 12, and 13 can continuously transfer a reference amount of data during a single data transfer operation) is set. In this example, it is preferable that the request suspension section 5 suspends the supply of the bus use permission request signal from the DMAC 1 to the arbitration controller 6 for one clock cycle. However, according to the present invention, the request suspension section 5 may suspend the supply of the bus use permission request signal for a period longer than one clock cycle.

The priority determination holding circuit 3 receives data transfer request signals, DREQ-A, DREQ-B, and DREQ-C, from the three function modules 11, 12, and 13 each of which requests a continuous data transfer based on a DMA transfer method. When the DMAC 1 is not permitted to use the system bus B1 (FIG. 1) or when a function module which is permitted to transfer data is changed by changing channels respectively connecting the DMAC 1 to the three function modules 11, 12, and 13, the priority determination holding circuit 3 pulls an output signal corresponding to a channel connected to a function module having the highest priority to a high level and keep the output signal at the high level. The priority determination holding circuit 3 supplies output signals SELCH-A, SELCH-B, and SELCH-C to AND gates 21, 22, and 23, respectively. The AND gates 21, 22, and 23 logically synthesize the output signals SELCH-A, SELCH-B, and SELCH-C with the data transfer request signals DREQ-A, DREQ-B, and DREQ-C, respectively. An OR gate 24 logically synthesizes output pulses from the AND gates 21, 22, and 23 so as to output a synthesized signal to a falling edge detection one clock low pulse generation section 25. In the meantime, an OR gate 20 logically synthesizes the data transfer request signals DREQ-A, DREQ-B, and DREQ-C. An AND gate 26 logically multiplies an output of the OR gate 20 and an output of the falling edge detection one clock low pulse generation section 25 so as to generate a signal SMREQ.

In the presence of the signal SMREQ generated as described above, an AND gate 27 outputs a LOW level pulse signal only for one clock cycle even if, at a time when an amount of data which is requested by a function module currently having a permission to transfer data has been transferred, any one of the other function modules is issuing a data transfer request signal. As a result, an output of a bus use permission request signal DMBREQ from an OR gate 19, which is an output of the DMAC 1, is interrupted.

Furthermore, the priority determination holding circuit 3 supplies output signals SELCH-A, SELCH-B, and SELCH-C to a selector 32 based on the determined order of priority of data transfer. Based on these signals SELCH-A, SELCH-B, and SELCH-C, the selector 32 supplies data stored in the continuous data transfer number set register 4 which corresponds to a selected channel as an output signal DMTRN to a comparator 34 in a subsequent stage.

On the other hand, a counter 33 counts the amount of data which is transferred by the DMAC 1 using the system bus B1 (specifically, the counter 33 increments by 1 every time a predetermined amount of data is transferred) and supplies a result of the count as an output signal DMCNT to the comparator 34. When the output signal DMCNT from the counter 33 is equal to the output signal DMTRN from the selector 32, the comparator 34 transmits an EQU signal to a one clock LOW pulse generator 28. In response to the EQU signal, the one clock LOW pulse generator 28 outputs a pulse signal which is at a LOW level for one clock. This pulse signal is logically synthesized by the AND gate 27 with the signal SMREQ generated from the data transfer request signals DREQ-A, DREQ-B, and DREQ-C into an internal request signal DMREQ. This internal request signal DMREQ interrupts the supply of the bus use permission request signal DMBREQ from the DMAC 1 for one clock cycle from a time when data transfer through a channel selected by the priority determination holding circuit 3 is completed or when the amount of data set in the continuous data transfer number set register 4 has been transferred.

Furthermore, the data transfer request signals DREQ-A, DREQ-B, and DREQ-C supplied from the function modules 11, 12, and 13 through the respective channels are logically synthesized with output signals CH-APRIV, CH-BPRIV, and CH-CPRIV from a DMA priority channel set register 2 by AND gates 15, 16, and 17, respectively. Output signals from the AND gates 15, 16, and 17 are logically synthesized by an OR gate 18 into a signal SEQ. The signal SEQ is logically synthesized by the OR gate 19 with the internal request signal DMREQ which was generated by the request suspension section 5, and a signal obtained as a result of the synthesis is output as a bus use permission request signal DMBREQ to the arbitration controller 6.

As described above, the supply of the bus use permission request signal DMBREQ is suspended for one clock cycle from a time when data transfer through a channel selected by the priority determination holding circuit 3 is completed or when the amount of data set in the continuous data transfer number set register 4 has been transferred. However, when a data transfer request with respect to a prior channel set in the DMA priority channel set register 2 is being issued, the bus use permission request signal DMBREQ is supplied to the arbitration controller 6 without being interrupted.

When a data transfer request signal is being issued, in response to the output signals SELCH-A, SELCH-B, and SELCH-C from the priority determination holding circuit 3, a DACK generation section 31 generates: a strobe signal DMSTRB indicating that the DMAC 1 obtained the permission to use the system bus B1 for accessing the external memory 14; signals DACK-A, DACK-B, and DACK-C each of which indicates that transfer of data can be executed using the system bus B; and a count enable signal CE supplied to the counter 33 which counts the amount of transferred data.

Figure 3:
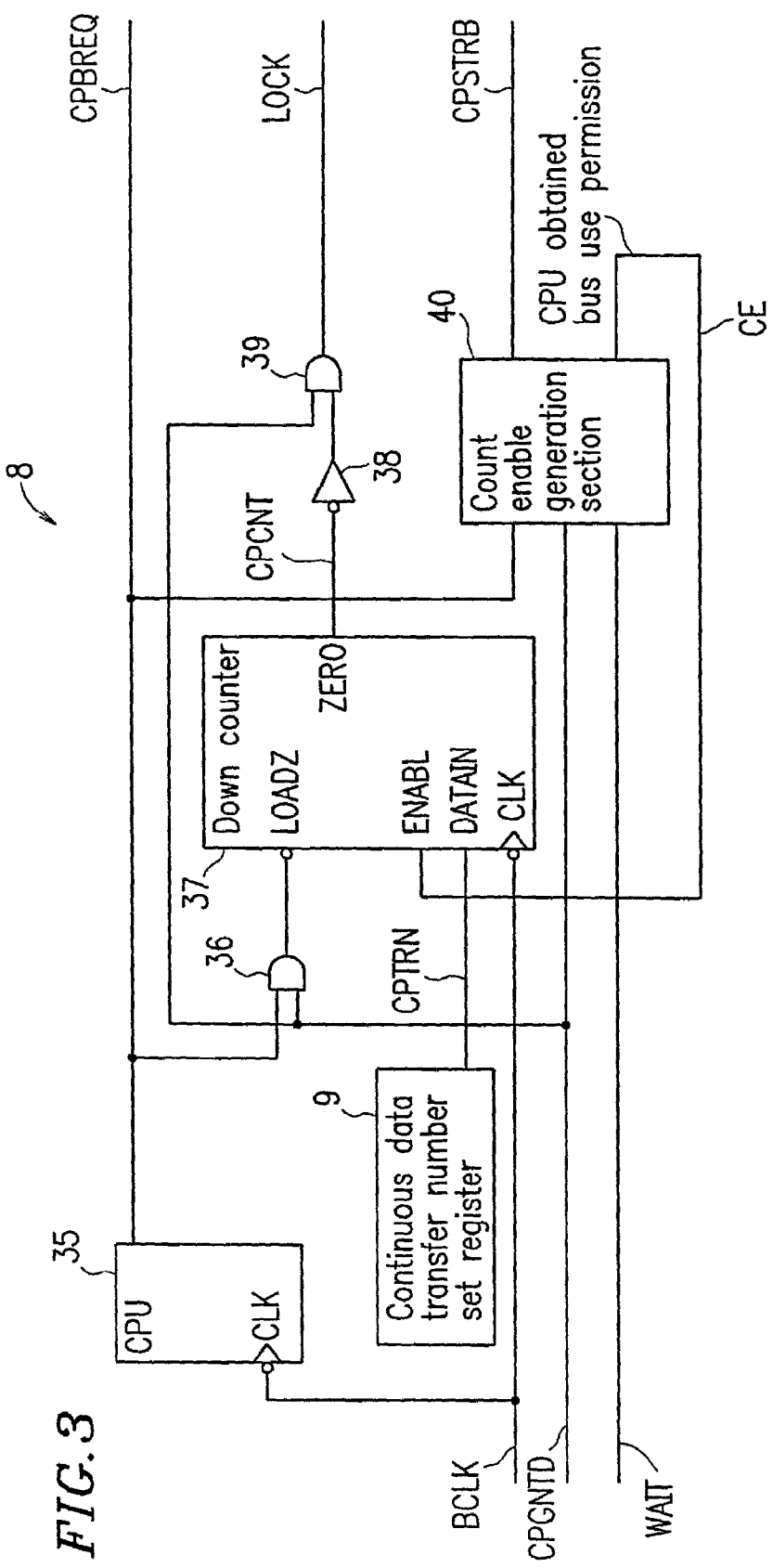
FIG. 3 shows a structure of a CPU & i/f 8 in the image processing system S1 shown in FIG. 1 according to the present invention.

FIG. 3 shows a structure of the CPU & i/f 8 in the image processing system S1 shown in FIG. 1 according to the present invention. The CPU & i/f 8 includes a continuous data transfer number set register 9, a down counter 37, and a count enable generation section 40. In the continuous data transfer number set register 9, an amount of data which can be continuously transferred by a CPU 35 (the number of times that a reference amount of data can be continuously transferred by the CPU 35) is set.

At the beginning of an access to the external memory 14, the CPU 35 pulls an access request signal CPBREQ to a high level. When the CPU 35 accesses consecutive addresses of the external memory 14 after the beginning of the access, the CPU 35 keep the access request signal CPBREQ at the high level. Note that when the CPU 35 is not structured so as to directly issue an access request signal, an attachment circuit may be provided outside of the CPU 35 for issuing the access request signal.

The access request signal CPBREQ from the CPU 35 is output as a bus use permission request signal to the arbitration controller 6. On the other hand, the access request signal CPBREQ is logically synthesized by the AND gate 36 with a bus use permission signal CPGNTD issued for the CPU 35 into a load signal, which is in turn output to the down counter 37. When the CPU 35 is not requesting a permission to use the system bus B1 (FIG. 1) or is not permitted to use the system bus B1, the down counter 37 receives a CPTRN signal which indicates the content of the continuous data transfer number set register 9. A signal CPCNT output from a ZERO terminal of the down counter 37 is inverted by an inverter 38. The inverted signal CPCNT is logically synthesized by the AND gate 39 with the bus use permission signal CPGNTD into a LOCK signal. When the CPU 35 is permitted to use the system bus B1 and starts data transfer, the down counter 37 counts the amount of data continuously transferred by the CPU 35 (specifically, the counter 37 decrements by 1 every time a predetermined amount of data is transferred) and continues to output the LOCK signal until the counted value reaches 0.

The count enable generation section 40 receives the access request signal CPBREQ, the bus use permission signal CPGNTD, and a WAIT signal. When a data transfer request is being issued from the CPU 35 and the CPU 35 has a bus use permission, the count enable generation section 40 generates a strobe signal CPSTRB which indicates that the CPU 35 obtained the permission to use the system bus B1 for accessing the external memory 14 and a count enable signal CE to be sent to the down counter 37 which counts the amount of data continuously transferred by the CPU 35.

FIG. 4 shows a structure of the arbitration controller 6 in the image processing system S1 of the present invention. The arbitration controller 6 includes the DMA priority set register, a detector 42 which detects a low-level clock for two or more clocks, and a state controller 41. The state controller 41 receives: the bus use permission request signal CPBREQ from the CPU & i/f 8; the bus use permission request signal DMBREQ from the DMAC 1; a signal DMBREQ2P which is pulled to a high level when the bus use permission request signal DMBREQ is suspended (i.e., at a low level) for two clock cycles of a system bus clock (BCLK); a signal WAIT which is output by a function module which is being accessed so as to be at a high level when a currently executed data transfer operation using the system bus B1 (FIG. 1) is not completed until a next clock cycle of the system bus clock (BCLK); a signal DMPRIV which indicates that a DMA data transfer by the DMAC 1 is prior to data transfer of the CPU & i/f 8; and a signal LOCK which indicates that the CPU 35 continuously uses the system bus B1.

Based on the states of the above signals, the state controller 41 determines which of the DMAC 1 and the CPU & i/f 8 is to be permitted to use the system bus B1. Then, based on this determination, the state controller 41 outputs a signal DMGNT and a signal DMGNTD. The signal DMGNT rises to a high level when the currently executed data transfer is completed and the state controller 41 permits the DMAC 1 to use the system bus B1. During the period when the signal DMGNT is at a high level, when the signal DMGNTD rises to a high level at a time when the currently executed data transfer is completed, such a transition of the signal DMGNTD indicates that the permission to use the system bus B1 has been actually given to the DMAC 1.

A signal CPGNT and a signal CPGNTD are obtained by inverting the signals DMGNT and DMGNTD with inverters 43 and 44, respectively. The signals CPGNT and CPGNTD are output as response signals in response to the bus use permission request from the CPU 35. The signals CPGNT rises to a high level at a time when the state controller 41 gives a permission to use the system bus B1 after the currently executed data transfer is completed. During the period when the signal CPGNT is at a high level, when the signal CPGNTD rises to a high level at a time when the currently executed data transfer is completed, this transition of the signal CPGNTD indicates that the permission to use the system bus B1 is actually given to the CPU 35.

FIG. 5 illustrates an example of an operation of the state controller 41 which realizes the above-described logic. This state transition operation includes four operation states, a DMA state 45, a NEXCPU state 46, a CPU state 47, and a NEXDMA state 48. The state controller 41 changes the operation states according to transition conditions 1–4. Furthermore, output levels of the signals DMGNT and DMGNTD for each of the operation states are shown in a "State Definition" section of FIG. 5. The state controller 41 transits from a current operation state to a next operation state only when the system bus clock (BCLK) falls to a low level while a transition condition from the current operation state to the next operation state is satisfied. If the condition is not satisfied, the state controller 41 remains in the current operation state. However, when the system S1 is initialized, the state controller 41 unconditionally transits to the DMA state 45 no matter what state the state controller 41 is currently in.

Now, an exemplary transition of the state controller 41 from the DMA state 45 immediately after the system S1 is initialized is described.

In the DMA state 45, the DMAC 1 has a permission to use the system bus B1 (bus use permission) and retains the bus use permission even after a current data transfer operation is completed. When a bus use permission request signal is issued by the CPU 35, the signal CPBREQ rises to a high level. When the signal DMBREQ is at a low level, i.e., a bus use permission request signal is not issued by the DMAC 1, and the signal DMPRIV is at a low level, i.e., the priority of the DMAC 1 over the CPU & i/f 8 is not set in the DMA priority set register 7 (transition condition 1), the state controller 41 transits to the NEXCPU state 46.

In the case where the priority of the DMAC 1 over the CPU & i/f 8 is set in the DMA priority set register 7 (i.e., the signal DMPRIV is at a high level), only when the signal CPBREQ is at a high level and the signal DMBREQ is at a low level for two or more clock cycles of the system bus clock (BCLK), i.e., only when the signal DMBREQ2P is at a high level, does the state controller 41 transit to the NEXCPU state 46.

Herein, the "two or more clock cycles" means that transmission of a bus use permission signal from the DMAC 1 to the arbitration controller 6 is suspended by the request suspension section 5 for one clock cycle, and then, the bus use permission request signal from the DMAC 1 is further suspended for another one or more clock cycles.

In the NEXCPU state 46, when the current data transfer is completed while the DMAC 1 has a bus use permission (i.e., when the signal WAIT falls to a low level), the state controller 41 transfers the bus use permission from the DMAC 1 to the CPU 35. That is, the completion of the current data transfer operation is detected by the transition of the signal WAIT to a low level, and accordingly, the state controller 41 transits to the CPU state 47 (transition condition 2).

In the CPU state 47, the CPU 35 has a permission to use the system bus B1 (bus use permission) and retains the bus use permission even after a current data transfer operation is completed. When a bus use permission request is issued by the DMAC 1, the state controller 41 transits to the NEXDMA state 48 (transition condition 3).

In the NEXDMA state 48, the CPU 35 has the bus use permission. When a current data transfer operation is completed (the signal WAIT falls to a low level), the bus use permission is transferred to the DMAC 1. That is, in the NEXDMA state 48, the completion of the current data transfer operation is detected by the transition of the signal WAIT to a low level, and accordingly, the state controller 41 transits to the DMA state 45. It should be noted that during the continuous data transfer by the CPU 35, the LOCK signal is at a high level, and the state controller 41 does not transit to the DMA state 45 unless the LOCK signal is cancelled (i.e., the LOCK signal falls to a low level) or the CPU 35 withdraws the bus use permission request (transition condition 4).

Figure 6:
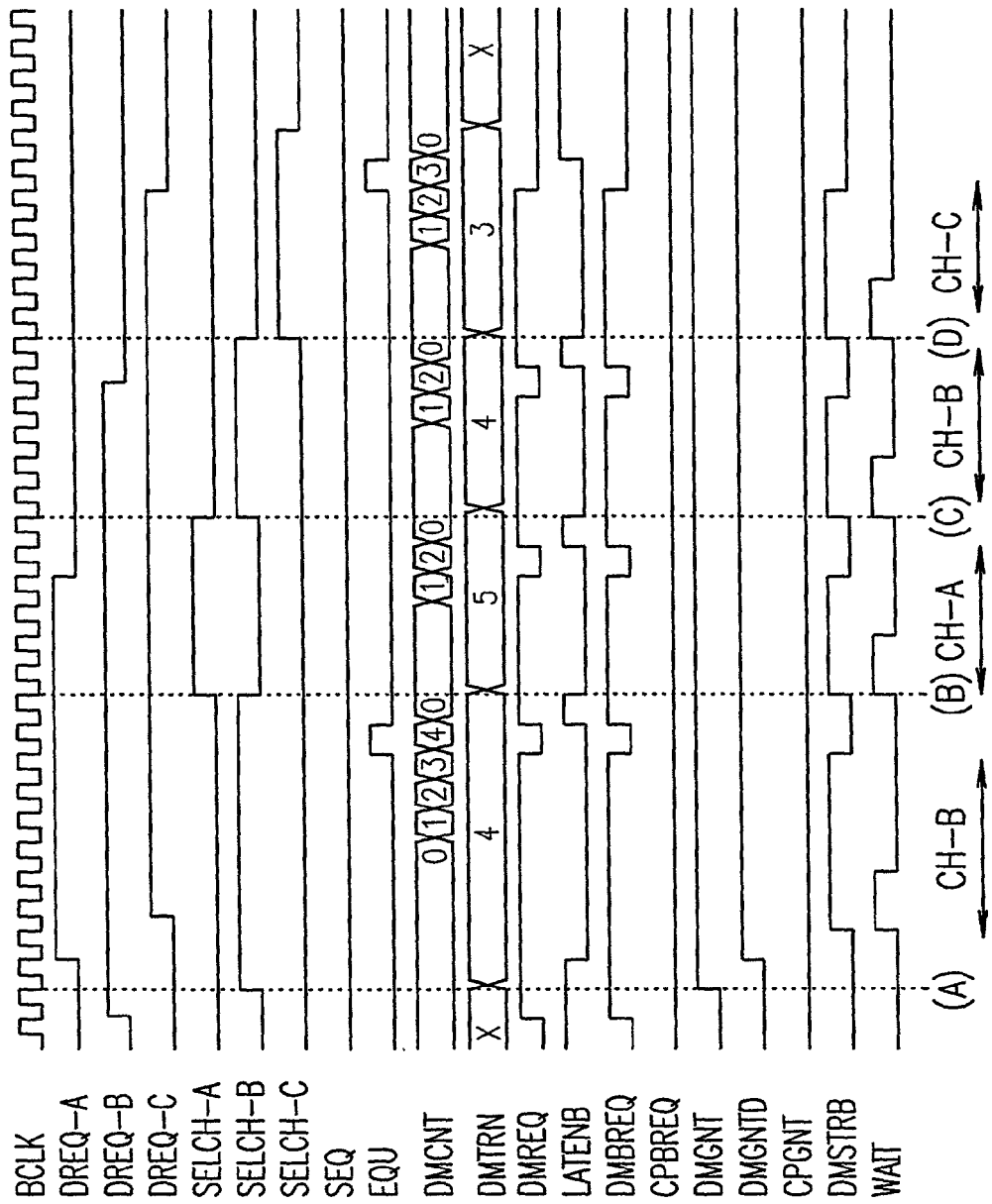
FIG. 6 is a timing chart for bus control in the case where a data transfer request is not issued by a CPU 35.

FIG. 6 is a timing chart for bus control in the case where a data transfer request is not issued by the CPU 35. A basic operation of the DMAC 1 in the image processing system S1 according to the present invention is described with reference to FIG. 6 in conjunction with FIGS. 1 and 2. Operating conditions are described later.

In FIG. 6, a strobe signal DMSTRB indicates that the DMAC 1 has a bus use permission and makes an access to an external memory through the system bus B1 (FIG. 1). If the strobe signal DMSTRB is at a high level at a falling edge of the system bus clock BCLK, a designated function module prepares for data transfer. After the preparation for data transfer is completed, the signal WAIT is pulled to a low level at a falling edge of the system bus clock BCLK, whereby one data transfer operation by the designated function module is ended. The function module executes data transfer in synchronization with a falling edge of the system bus clock BCLK.

<Operating Conditions>

The CPU 35 is not requesting a bus use permission.

Among data transfer request signals DREQ-A, DREQ-B, and DREQ-C supplied from function modules through the respective channels corresponding thereto, the signal DREQ-A has the highest priority and the signal DREQ-C has the lowest priority.

The priority among channels is not set in the DMA priority channel set register 2.

"5" is set in the Channel A continuous data transfer number set register 4a. (With this setting, data of an amount which is six times as much as a predetermined reference amount of data is continuously transferred by the function module A 11.)

"4" is set in the Channel B continuous data transfer number set register 4b. (With this setting, data of an amount which is five times as much as a predetermined reference amount of data is continuously transferred by the function module B 12.)

"3" is set in the Channel C continuous data transfer number set register 4c. (With this setting, data of an amount which is four times as much as a predetermined reference amount of data is continuously transferred by the function module C 13.)

The function module 11 connected to Channel A attempts to continuously transfer data of an amount which is three times as much as a predetermined reference amount of data.

The function module 12 connected to Channel B attempts to continuously transfer data of an amount which is eight times as much as the predetermined reference amount of data.

The function module 13 connected to Channel C attempts to continuously transfer data of an amount which is four times as much as the predetermined reference amount of data.

Assume that the function module B 12 connected to Channel B first issues a data transfer request signal DREQ-B. At the time when the signal DREQ-B is issued, no request is being issued through the other channels. Thus, a highest priority is given to Channel B. Accordingly, a signal SELCH-B output from the priority determination holding circuit 3 is pulled to a high level, the Channel B continuous data transfer number set register 4b is selected, and a signal DMTRN which indicates the value "4" set in the register 4b is output from the selector 32 to the comparator 34. In the meantime, in response to the issuance of the data transfer request signal DREQ-B, the DMAC 1 issues a bus use permission request signal DMBREQ. In FIG. 6, the CPU 35 does not request an access (i.e., bus use permission). Thus, at a next falling edge of the system bus clock BCLK, a signal DMGNT, which indicates that the DMAC 1 has a bus use permission, rises to a high level after a current data transfer operation is completed. Then, at a next falling edge of the system bus clock BCLK, a signal DMGNTD, which indicates that the bus use permission is actually given to the DMAC 1, rises to a high level. The DMAC 1 then pulls a strobe signal DMSTRB indicating that the DMAC 1 has the permission to use the system bus B1 (i.e., in this example, indicating that the function module B 12 can access the external memory 14) to a high level, and the function module B 12 executes data transfer through the system bus B1.

In the meantime, an enable signal LATENB, which is used for updating a content of the priority determination holding circuit 3, is disabled (i.e., falls to a low level) at time (A) when the bus use permission is given to the DMAC 1, and the content of the priority determination holding circuit 3 is fixed such that the bus use permission is given to the function module B 12 through Channel B. After that, an output from the priority determination holding circuit 3 is kept constant even if a data transfer request signal is issued through Channel A having a higher priority (i.e., issued from the function module A 11).

In this way, data transfer begins. During the data transfer, the counter 33 (FIG. 2) counts the amount of data continuously transferred through the system bus B1 (FIG. 1) at falling edges of the system bus clock BCLK (as described above, the counter 33 increments by 1 every time a predetermined amount of data is transferred). The counter 33 outputs to the comparator 34 a signal DMCNT which indicates the counted number. In the comparator 34, if the counted number is equal to the value of the signal DMTRN output from the selector 32, "4", an EQU signal output from the comparator 34 rises to a high level. As a result of the transition of the EQU signal to a high level, the internal request signal DMREQ output from the AND gate 27 is at a low level for one clock cycle. However, since a bus use permission request is not being issued by the CPU 35, the DMAC 1 still retains the bus use permission.

As a result of the internal request signal DMREQ being at a low level for one clock cycle, the enable signal LATENB supplied to the priority determination holding circuit 3 is enabled for one clock cycle. Thus, the content of the priority determination holding circuit 3 is fixed such that the bus use permission is issued to a function module having a highest priority among function modules which are currently requesting the bus use permission. In the example illustrated in FIG. 6, the content of the priority determination holding circuit 3 is fixed at time (B) such that the bus use permission is given to the function module A 11, and the output signal SELCH-A from the priority determination holding circuit 3 rises to a high level. As a result, the Channel A continuous data transfer number set register 4a is selected, and the output signal DMTRN from the selector 32 indicates "5" which has been set in the register 4a. The DMAC 1 outputs the strobe signal DMSTRB again for starting the data transfer by the function module A 11. The amount of transferred data is counted as described for the data transfer by the function module B 12. As for the data transfer by the function module A 11, all of a required amount of data can be transferred only by three counts, and at the time when the data transfer is completed, the data transfer request signal DREQ-A is disabled (i.e., falls to a low level). As a result of the disablement of the signal DREQ-A, the internal request signal DMREQ output from the AND gate 27 is at a low level for one clock cycle, and the enable signal LATENB which is supplied to the priority determination holding circuit 3 for updating the content of the priority determination holding circuit 3 is enabled for one clock cycle. Then, the order of priority is updated at time (C) such that the bus use permission is again given to the function module B 12 through Channel B.

In the meantime, the function module C 13 is issuing a data transfer request signal DREQ-C through Channel C. However, since the function module B 12 has a higher priority, the data transfer request from the function module B 12 is dealt with prior to that from the function module C 13. In this way, the function module B 12 starts the data transfer using the system bus B1. The amount of data to be transferred which was initially requested by the function module B 12 is completely transferred by transferring data of an amount which is corresponding to three (8−5=3) counts of the counter 33, i.e., an amount which is three times as much as the predetermined reference amount of data. Thus, at the time when the counter 33 counts three, the data transfer request signal DREQ-B is disabled (i.e., falls to a low level). As a result, in the same manner as described above, the content of the priority determination holding circuit 3 is fixed at time (D) such that the bus use permission is given to the function module C 13, and the data transfer by the function module C 13 is started. As described above, in this example, the function module C 13 attempts to continuously transfer data of an amount which is four times as much as the predetermined reference amount of data, and according to the setting in the Channel C continuous data transfer number set register 4c, data of an amount which is four times as much as a predetermined reference amount of data can be continuously transferred by the function module C 13. Thus, the data transfer by the function module C 13 is completed by continuously transferring data of an amount which is four times as much as the predetermined reference amount of data.

Figure 7:
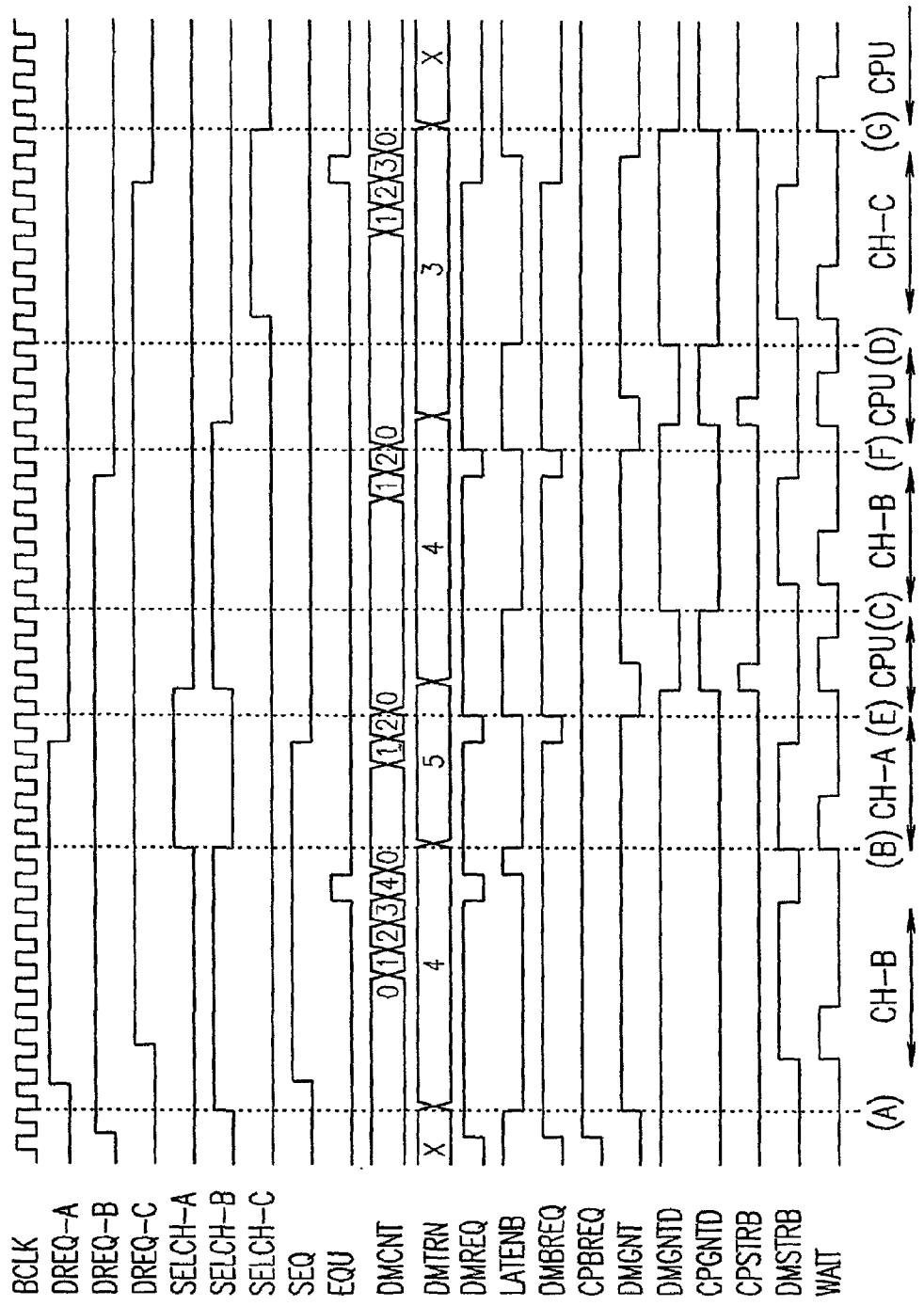
FIG. 7 is a timing chart for bus control in the case where the priority of channels is set in a DMA priority channel set register 2.

FIG. 7 is a timing chart for bus control in the case where the priority of channels is set in the DMA priority channel set register 2. In the example illustrated in FIG. 7, two of the conditions prescribed in the example illustrated in FIG. 6 are modified as follows:

The CPU 35 is incessantly requesting a bus use permission. (The value set in the continuous data transfer number set register 9 is "0". The LOCK signal is kept disabled.)

The priority of channels is set in the DMA priority channel set register 2 such that Channel A (i.e., function module A 11) has a higher priority with respect to the other channels.

The timing chart of FIG. 7 based on the above conditions is different from that of FIG. 6 in that the bus use permission request signal is interrupted because the CPU 35 is incessantly requesting the bus use permission, and as a result, the bus use permission is transferred from the DMAC 1 to the CPU 35. As shown in FIG. 7, the bus use permission is transferred from the DMAC 1 to the CPU 35 at time (E), time (F), and time (G). For example, immediately before time (E), the signal DMBREQ, which is the bus use permission request signal of the DMAC 1, is at a low level for one clock cycle. On the other hand, during the period when the signal DMBREQ is at a low level for the one clock cycle, the signal CPBREQ, which is the bus use permission request signal of the CPU 35, is at a high level. As a result, the state controller 41 of the arbitration controller 6 transits to the NEXCPU state 46 and then transits to the CPU state 47. Accordingly, the bus use permission is given to the CPU 35, the CPU 35 pulls the strobe signal CPSTRB to a high level, and then, the CPU 35 executes data transfer using the system bus B1.

However, the state controller 41 transits to the NEXDMA state 48 immediately after the transition from the NEXCPU state 46 to the CPU state 47 because the signal DMBREQ, which is the bus use permission request signal of the DMAC 1, is disabled (i.e., at a low level) only for one clock cycle and then enabled again. At this time, as described above, the value set in the continuous data transfer number set register 9 is "0", and the LOCK signal is kept disabled. Therefore, the state controller 41 again transits to the DMA state 45 at a next falling edge of the system bus clock BCLK. At and after time (F) also, the operation proceeds in the same manner as the above. However, at time (G), i.e., at a time when the bus use permission is given to the CPU 35, the CPU 35 is not requesting the bus use permission. Thus, the CPU 35 continues to use the system bus B1.

However, at time (B), the bus use permission is not given to the CPU 35, but the DMAC 1 continues to use the system bus B1. This is because the priority of channels is set in the DMA priority channel set register 2 such that Channel A (i.e., function module A 11) has a higher priority with respect to the CPU 35. That is, with such a setting in the register 2, the signal SEQ indicating that a data transfer request signal is being issued through the prior Channel A is output, and accordingly, the signal DMBREQ transmitted to the arbitration controller 6 is not interrupted, although the internal request signal DMREQ in the DMAC 1 is disabled for one clock cycle, and the priority of channels set in the DMA priority channel set register 2 is changed.

Figure 8:
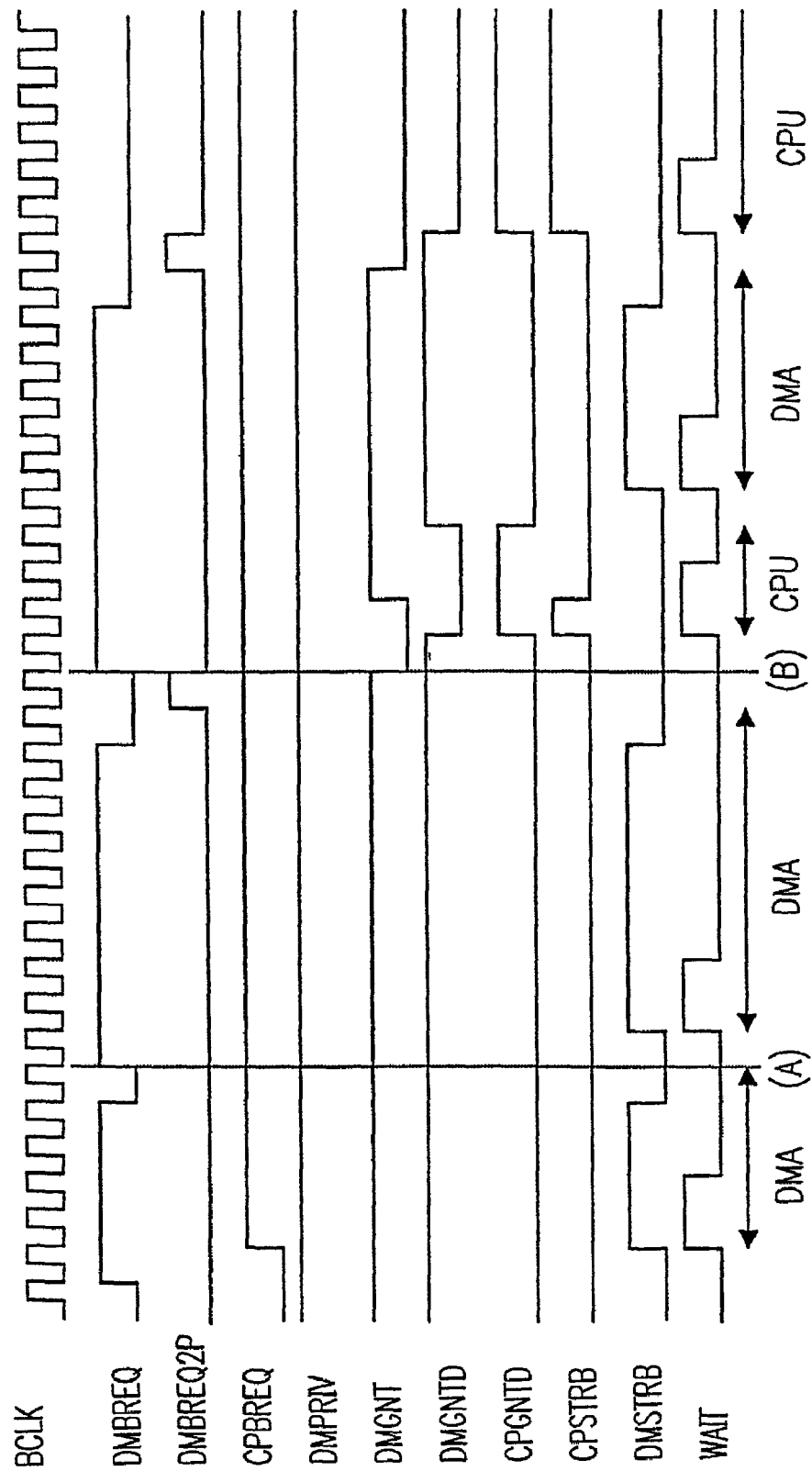
FIG. 8 is a timing chart for bus control in the case where the priority of a DMAC 1 over a CPU 35 is set in a DMA priority set register 7.

FIG. 8 is a timing chart for bus control in the case where the priority of the DMAC 1 over the CPU 35 is set in the DMA priority set register 7. Operating conditions in this example are as follows:

The CPU 35 is incessantly requesting a bus use permission. (The value set in the continuous data transfer number set register 9 is "0". The LOCK signal is kept disabled.)

The priority of the DMAC 1 over the CPU 35 is set in the DMA priority set register 7. That is, the signal DMPRIV is at a high level.

Referring to FIG. 8, firstly, the DMAC 1 issues a bus use permission request signal DMBREQ while the DMAC 1 has the bus use permission (the signal DMGNTD is at a high level). Then, the DMAC 1 outputs a strobe signal DMSTRB and starts data transfer using the system bus B1 (FIG. 1). Immediately before time (A), the DMAC 1 disables the bus use permission request signal DMBREQ. However, one clock cycle later, i.e., at time (A), the DMAC 1 enables the signal DMBREQ again and requests the bus use permission. In the meantime, the signal DMPRIV is at a high level because the priority of the DMAC 1 over the CPU 35 is set in the DMA priority set register 7. Thus, the bus use permission request signal DMBREQ is at a low level only for one clock cycle. However, since the signal DMBREQ2P is at a low level, a transition of operation state of the state controller 41 does not occur, and therefore, the DMAC 1 continues to occupy the system bus B1.

Immediately before time (B), the bus use permission request signal DMBREQ is disabled (i.e., at a low level) for two clock cycles, and the bus use permission request signal DMBREQ2P is at a low level for one clock cycle. As a result, the state controller 41 of the arbitration controller 6 transits from the DMA state 45 through the NEXCPU state 46 to the CPU state 47. Accordingly, the bus use permission is transferred to the CPU 35, and the CPU 35 executes data transfer using the system bus B1.

After the CPU 35 has transferred a reference amount of data once, the bus use permission is returned to the DMAC 1 because the LOCK signal is disabled. The bus use permission request signal DMBREQ is never disabled (i.e., at a low level) for two or more clock cycles so long as a plurality of function modules are requesting a data transfer of the DMAC 1. Thus, the CPU 35 can use the system bus B1 only when no data transfer request issued from a function module is in waiting.

Figure 9:
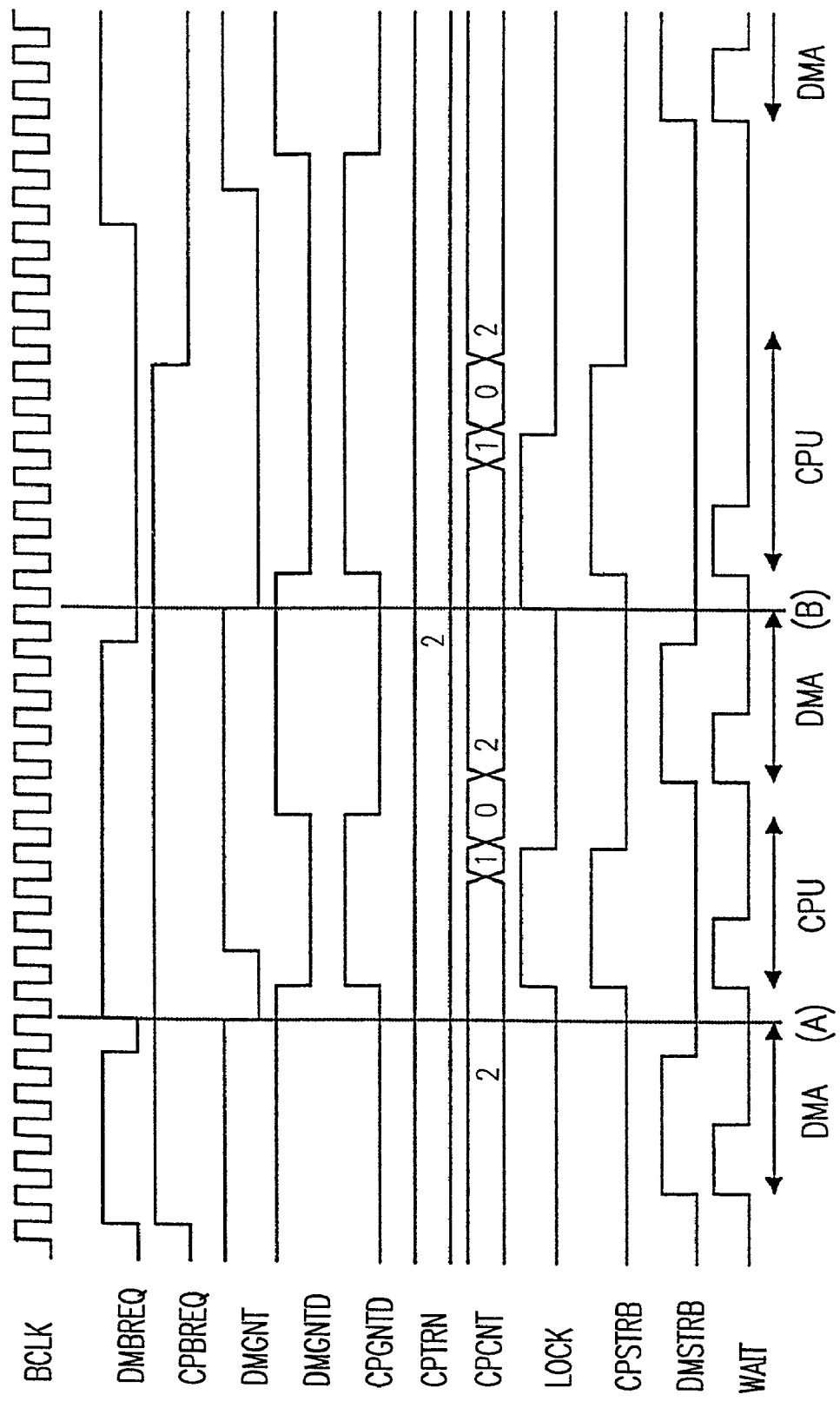
FIG. 9 is a timing chart for bus control in the case where the amount of data which can be continuously transferred by the CPU 35 is set in a continuous data transfer number set register 9.

FIG. 9 is a timing chart for bus control in the case where the amount of data which can be continuously transferred by the CPU 35 is set in the continuous data transfer number set register 9. In the example illustrated in FIG. 9, a value "2" is set in place of "0" in the continuous data transfer number set register 9, and the bus use permission is not transferred to the DMAC 1 while the CPU 35 continuously transfers data for three ("2" plus 1) clock cycles. However, in the case where the DMAC 1 does not issue a bus use permission request signal, the CPU 35 can continue to use the system bus B1 for data transfer regardless of the value set in the continuous data transfer number set register 9 so long as the CPU 35 continues to issue a bus use permission request.

Referring to FIG. 9, firstly, the DMAC 1 issues a bus use permission request signal DMBREQ, and concurrently, the CPU 35 issues a bus use permission request signal CPBREQ, while the DMAC 1 has the bus use permission (the signal DMGNTD is at a high level). Then, the DMAC 1 issues a strobe signal DMSTRB, and a granted function module executes data transfer using the system bus B1. Immediately before time (A), the DMAC 1 disables the signal DMBREQ (i.e., pulls the signal DMBREQ to a low level), and the bus use permission is transferred to the CPU 35. At the time when the bus use permission is transferred to the CPU 35, i.e., at time (A), the signal DMBREQ is enabled again, and accordingly, the state controller 41 of the arbitration controller 6 transits to the NEXDMA state 48. At this time, the CPU 35 retains the bus use permission without being deprived of the bus use permission by the DMAC 1 even after a current data transfer operation is completed, although the WAIT signal is at a low level. This is because the signal CPTRN output from the continuous data transfer number set register 9 indicates the count value "2", and this value "2" is set in the down counter 37 as an initial value. As a result, the signal CPCNT indicates the value "2", and accordingly, the LOCK signal is at a high level. The count value is decremented every time the CPU 35 transfers a predetermined reference amount of data, and when the count value reaches 0, the LOCK signal is cancelled. Then, the bus use permission is transferred from the CPU 35 to the DMAC 1.

After time (B), the bus use permission is transferred again to the CPU 35, and the CPU 35 executes data transfer using the system bus B1. At this time, since the DMAC 1 is not issuing a bus use permission request signal, the CPU 35 can continue to occupy the system bus B1 for data transfer regardless of the value set in the continuous data transfer number set register 9 so long as the CPU 35 continues to issue a bus use permission request.

As described hereinabove, an image processing system of the present invention can optimally control the assignment of the bus use permission between the DMAC 1 and the CPU 35 without causing a vacant time when the system bus B1 is unoccupied. Even in a system where a memory which requires an overhead time only at the beginning of a continuous access to the memory, such as a synchronous DRAM, etc., is incessantly accessed, such a vacant time is not caused.

According to the present invention, the continuous data transfer number set register 4 may have a function for setting the amount of data which can be continuously transferred between the DMAC 1 and an external device through the system bus B1.

Figure 10:
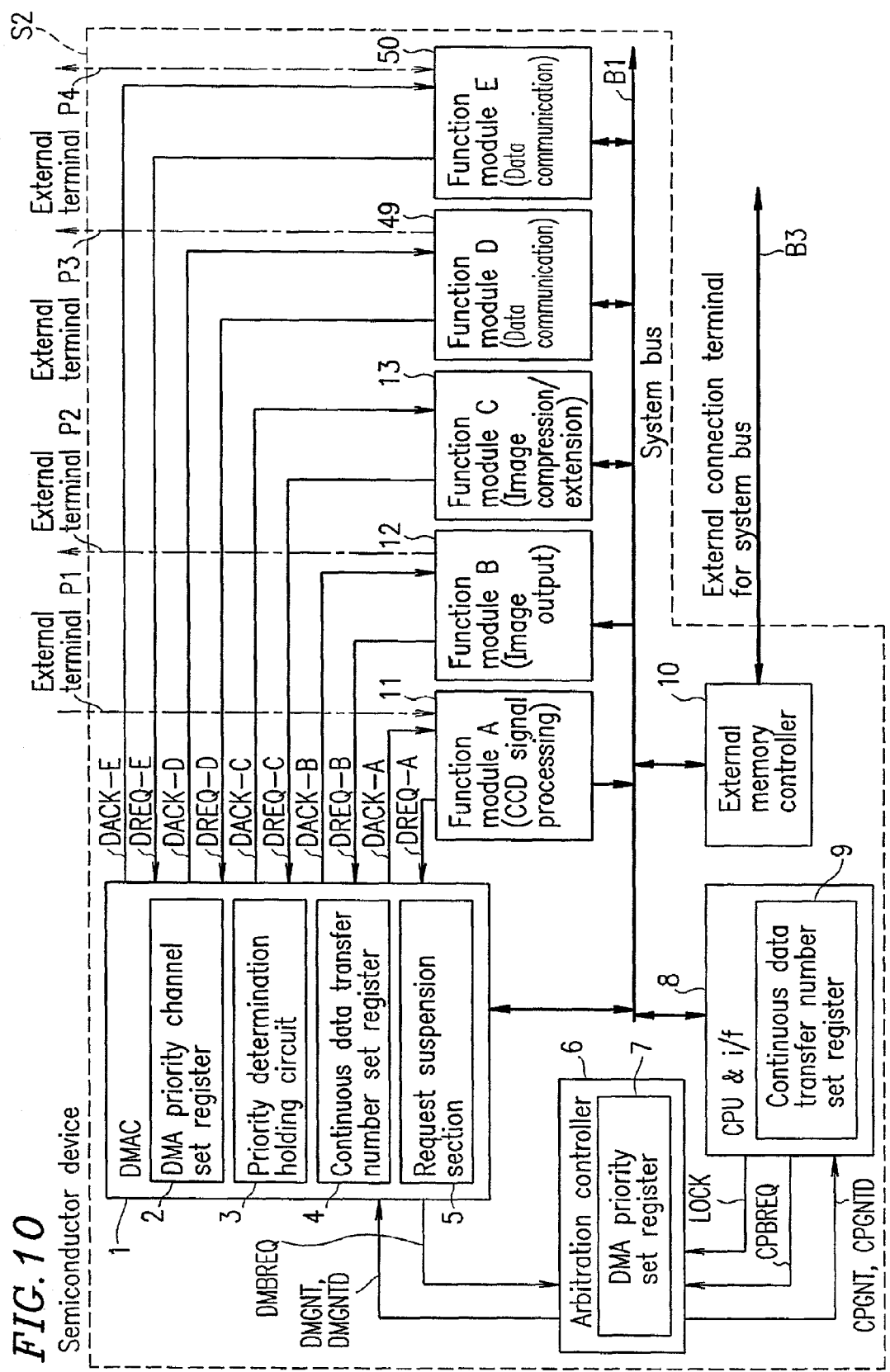
FIG. 10 shows a semiconductor device S2 including an image processing system according to the present invention.

FIG. 10 shows a semiconductor device S2 including an image processing system according to the present invention. The semiconductor device S2 includes: function modules 11, 12, 13, 49, and 50; a DMAC 1; an arbitration controller 6; an external memory controller 10; and a system bus B1. These components are integrated on a silicon chip. The function modules 11, 12, and 13 perform CCD signal processing, image output, and image compression/extension, respectively. The semiconductor device S2 has the same structure as that of the image processing system S1 shown in FIG. 1 except for the function modules 49 and 50 and external connection terminals P1, P2, P3, and P4.

In the semiconductor device S2, the function modules 11, 12, 49, and 50 have the external connection terminals P1, P2, P3, and P4, respectively, for communication with the outside of the device S2. The function modules 11, 12, 13, 49, and 50 include modules for image processing (CCD signal processing (11), image output (12), and image compression/extension (13)) and modules for data communication (49 and 50). Furthermore, since the semiconductor device S2 is connected to an external device via only an external connection terminal B3 for the system bus B1, it is only necessary to provide one line of bus, i.e., the system bus B1. Accordingly, the size of the semiconductor device S2 and the power consumption thereof are reduced. Thus, a high-speed image processing device based on a single bus system, whose size and power consumption is small, is realized.

Specifically, in a two-line bus system where each of a system bus and an image bus exclusively used for image data has 32 bits, 64 data signal terminals are required for connecting to an external memory. On the other hand, in the semiconductor device S2 based on a single bus according to the present invention, no bus line is required in addition to the system bus B1. Thus, it is only necessary to provide 32 data signal terminals for connecting to the external memory. Thus, the semiconductor device S2 requires a smaller number of terminals, and accordingly, the size thereof is reduced. Furthermore, the power consumed by driving external signal lines through the respective terminals is reduced as a result of the reduction in the number of terminals.

Figure 11:
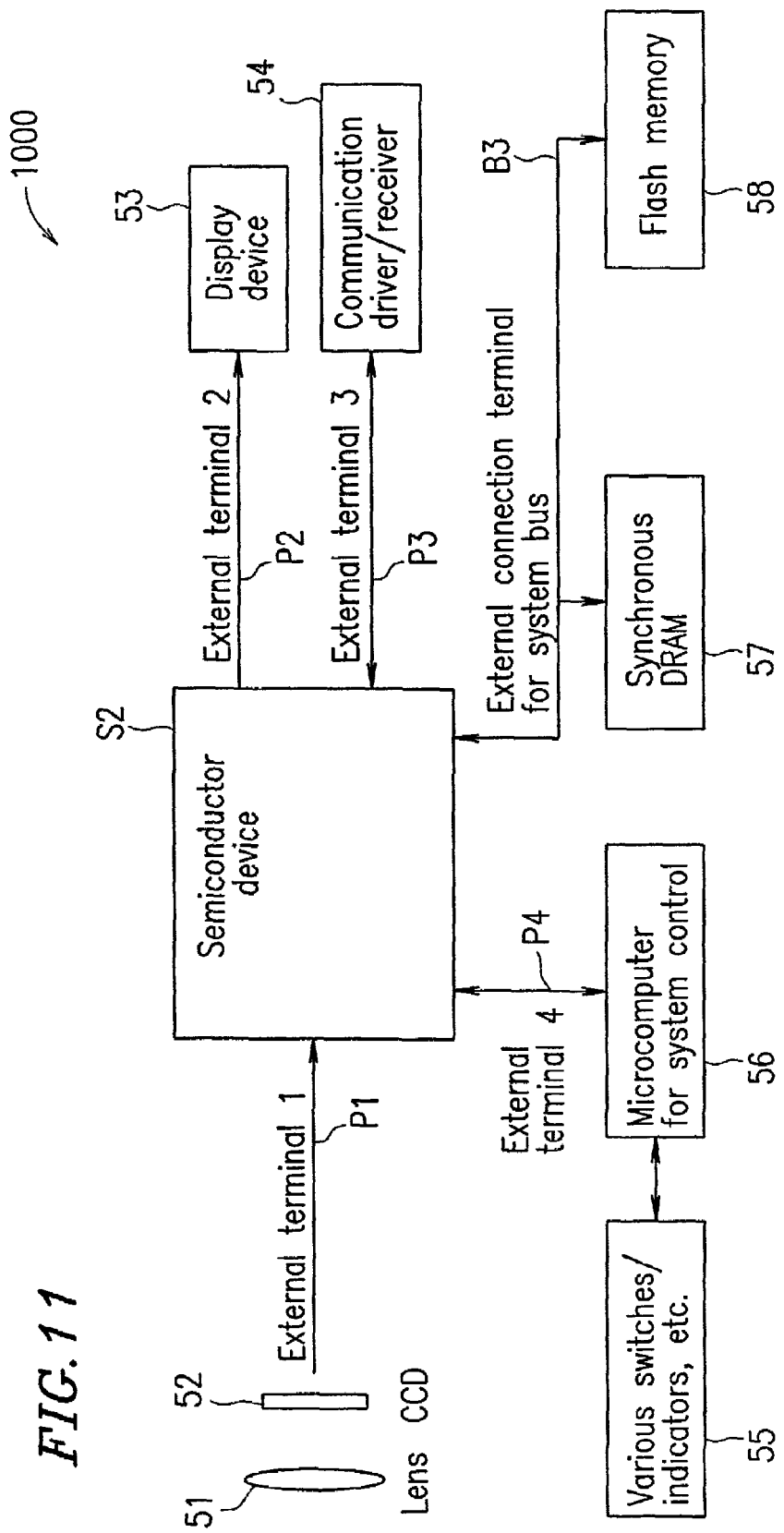
FIG. 11 shows a digital still camera apparatus 1000 according to the present invention.
Figure 12:
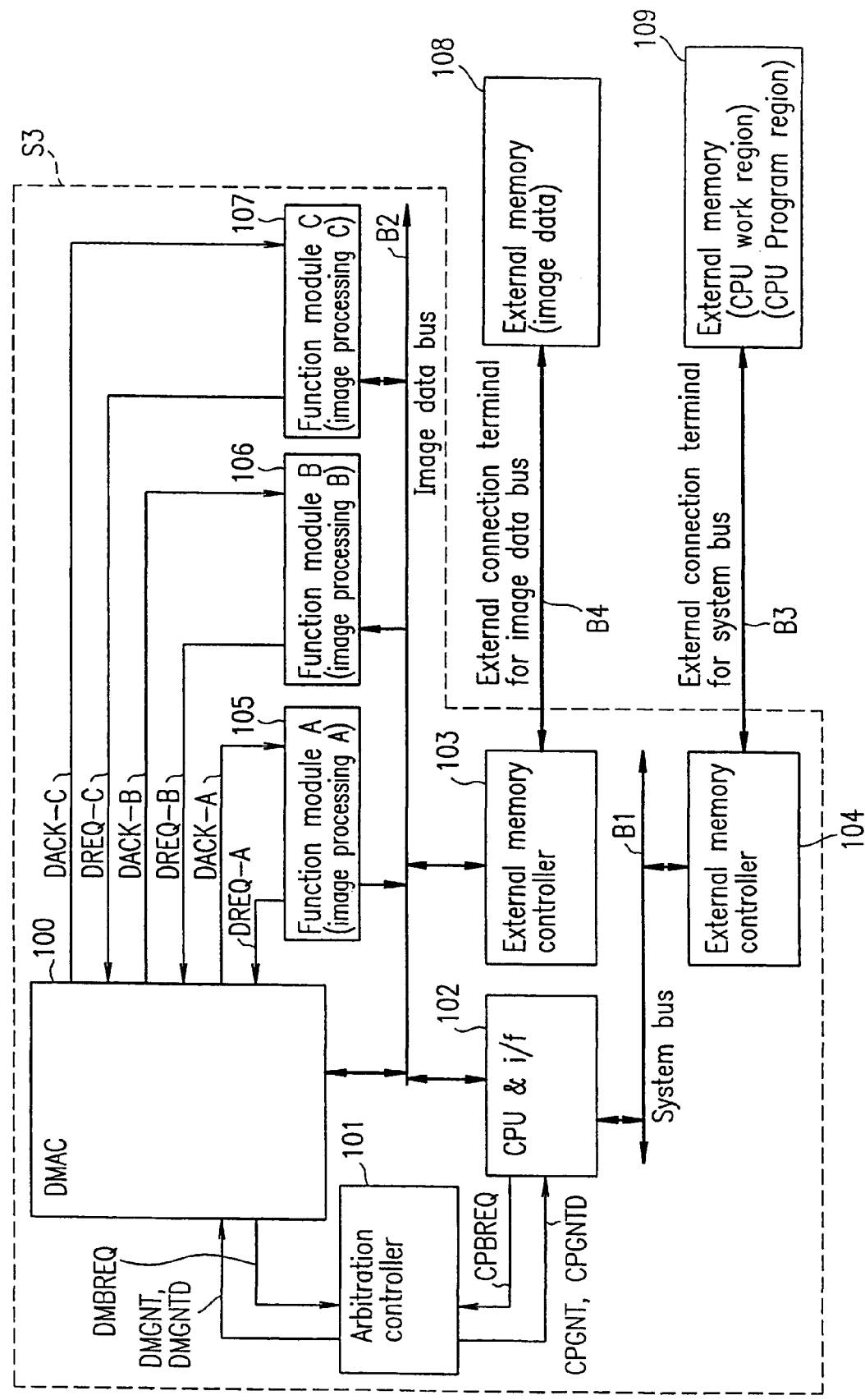
FIG. 12 is a block diagram showing a high-speed image processing system S3 based on a conventional bus control method.
Figure 13:
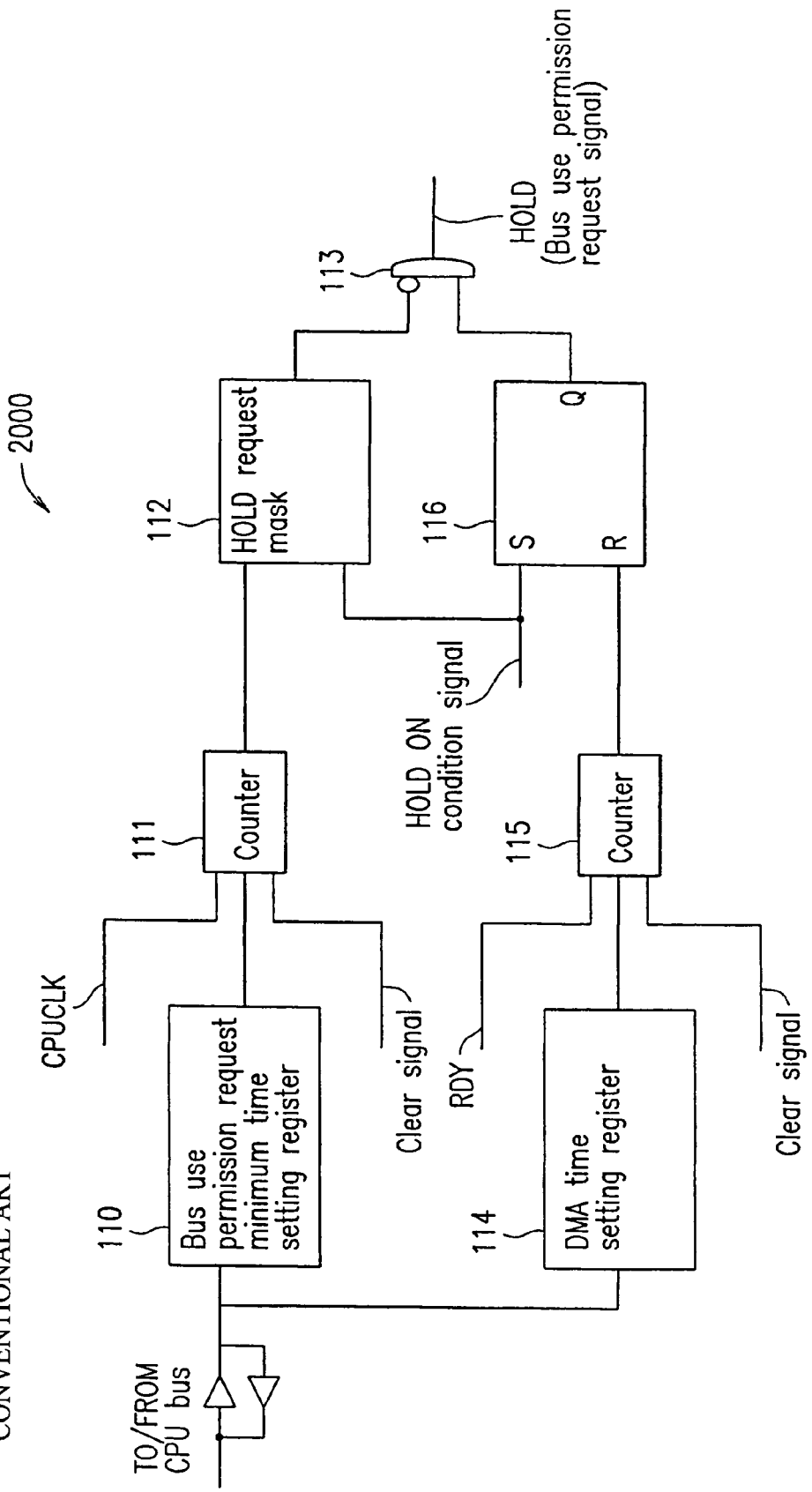
FIG. 13 is a block diagram showing a conventional bus control system 2000.
Figure 14:
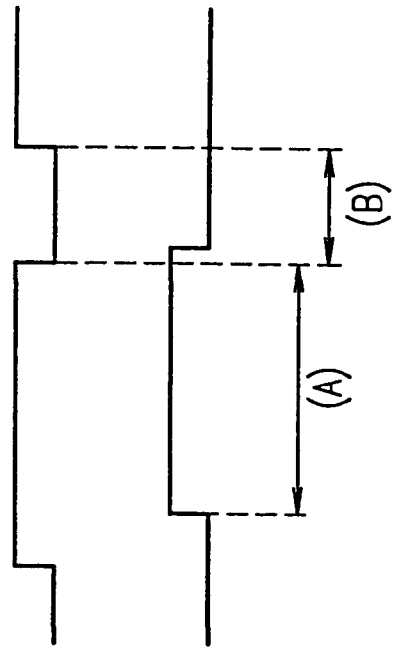
FIG. 14 is a timing chart showing signals output from the conventional bus control system 2000.

FIG. 11 shows a digital still camera apparatus 1000 according to the present invention. The digital still camera apparatus 1000 includes the semiconductor device S2 shown in FIG. 10. An image formed on a charge coupled device (CCD) 52 using a lens 51 is input as image data in the semiconductor device S2 through the external terminal P1 and subjected to various types of image processing. Image data processed in the semiconductor device S2 is output to a display device 53 through the external terminal P2. Furthermore, the processed image data may be output, when necessary, to a communication driver/receiver 54 through the external terminal P3 in order to be output to an external apparatus (not shown). Furthermore, data from the external apparatus may be received by the communication driver/receiver 54 and input through the external terminal P3 into the semiconductor device S2. The data may be subjected to appropriate image processing and output as image data to the display device 53 through the external terminal P2.

In this embodiment, a microcomputer 56 for system control, which is connected to the semiconductor device S2 through the external terminal P4, controls input of various switch operations and output of data to various indicators, such as LED, etc., which are required for operation of the camera apparatus 1000. A CPU is provided in the semiconductor device S2. A flash memory 58 which is used for containing program data for the CPU which executes system control, character data used for displaying characters or the like on the display device 53, etc., and a synchronous DRAM 59 which is used as an work area for the CPU or used for containing image data or the like are connected to the external connection terminal B3 which is used for the system bus B1.

By employing the semiconductor device S2 shown in FIG. 10, a system which is required to process a large amount of image data at a high speed, such as a digital still camera, can be achieved with a single system bus. Furthermore, a single system bus structure only requires one memory chip whereas a dual bus structure requires at least two memory chips (one for a system bus and the other for exclusive image bus). Thus, according to the present invention, i.e., with the single system bus structure, the number of components can be reduced, and accordingly, the area for mounting the components also can be reduced. As a result, the size of an apparatus is reduced, and additionally, the power consumed by the memory chips is also reduced due to the reduction in the number of the memory chips. Furthermore, as a result of the reduction in the number of the memory chips, the number of soldering points is reduced, and therefore, the reliability of the image processing system on a mounting surface is improved.

As described above, in an image processing system of the present invention, a DMAC includes a continuous data transfer number set register and a request suspension section, and an arbitration controller includes a DMA priority set register. With such a structure, a permission to use a bus is selectively given to the DMAC or a CPU. Thus, even with a single system bus, all of the data transfer can be efficiently executed.

Furthermore, in a semiconductor device of the present invention, a memory for containing image data and a memory used as a work area for the CPU can be formed in a same memory chip. Thus, the number of memories required in the image processing system is reduced, and accordingly, the power consumed in the entire image processing system is reduced.

Further still, in a digital still camera apparatus according to the present invention, the number of memories can be reduced. As a result, the number of components used in the entire apparatus, and the size of a printed board, can be reduced. Thus, the cost of a final product is reduced, while the reliability of mounting of components is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data processing system, comprising:
at least one function module connected to a single system bus;
a data transfer controller which outputs a first bus use permission request signal based on a data transfer request signal output from the at least one function module;
a central processing unit connected to the system bus which outputs a second bus use permission request signal;
an arbitration controller for determining, based on the first and second bus use permission request signals, which of the data transfer controller and the central processing unit should obtain a permission to use the system bus;
a section for setting a first data amount which can be continuously transferred by the at least one function module;
a section for suspending an output of the first bus use permission request signal to the arbitration controller for at least one clock cycle after a data transfer by the at least one function module is completed; and
a section for giving the permission to use the system bus to one of the data transfer controller and the central processing unit in such a manner that the data transfer controller has a priority over the central processing unit during a period when the first bus use permission request signal is being issued.

2. A data processing system according to claim 1, wherein, after a data transfer by the at least one function module is completed and the output of the first bus use permission request signal to the arbitration controller is then suspended for at least one clock cycle, in the case where the output of the first bus use permission request signal to the arbitration controller is further suspended for another one or more clock cycles, the permission to use the system bus is given to the central processing unit based on the second bus use permission request signal.

3. A data processing system according to claim 1, further including a section for setting a second data amount which can be continuously transferred by the central processing unit,
wherein in the case where the second data amount is not equal to a predetermined amount, the central processing unit continues to execute data transfer even when the data transfer controller is requesting the permission to use the system bus during the data transfer by the central processing unit.

4. A semiconductor device including the data processing system of claim 1.

5. A digital camera apparatus including the semiconductor device of claim 4.

6. A semiconductor device including the data processing system of claim 2.

7. A digital camera apparatus including the semiconductor device of claim 6.

8. A semiconductor device including the data processing system of claim 3.

9. A digital camera apparatus including the semiconductor device of claim 8.

10. A data processing system, comprising:
at least one function module having a first priority connected to a single system bus;
a data transfer controller outputting a first bus use permission request signal based on a data transfer request signal output from the at least one function module;
a central processing unit connected to the system bus which outputs a second bus use permission request signal;
an arbitration controller for determining, based on the first and second bus use permission request signals, whether the data transfer controller or the central processing unit should obtain a permission to use the system bus;
a first section for setting a first data amount which can be continuously transferred by the at least one function module;
a second section for selectively suspending an output of the first bus use permission request signal to the arbitration controller for at least one clock cycle after a data transfer by the at least one function module is completed unless a data transfer request signal is being issued by the at least one function module and the priority of the at least one function module issuing the data transfer request is higher than a priority of the central processing unit; and
a third second for giving the permission to use the system bus to one of the data transfer controller and the central processing unit in such a manner that the data transfer controller has a priority over the central processing unit during a period when the first bus use permission request signal is being issued.

11. A semiconductor device including the data processing system of claim 10.

12. A digital camera apparatus including the semiconductor device of claim 11.

13. A method of processing data comprising the steps of:
connecting at least one function module to a single system bus;
providing a data transfer controller;
outputting a data transfer request signal from the at least one function module to the data transfer controller;
providing an arbitration controller;
outputting from the data transfer controller to the arbitration controller a first bus use permission request signal based on the data transfer request signal output from the at least one function module;
connecting a central processing unit to the system bus;
outputting a second bus use permission request signal from the central processing unit to the arbitration controller;
determining, based on the first and second bus use permission request signals, which of the data transfer controller and the central processing unit should obtain a permission to use the system bus;
setting a first data amount which can be continuously transferred by the at least one function module;
suspending the first bus use permission request signal to the arbitration controller for at least one clock cycle after a data transfer by the at least one function module is completed; and
giving the permission to use the system bus to one of the data transfer controller and the central processing unit in such a manner that the data transfer controller has a priority over the central processing unit during a period when the first bus use permission request signal is being issued.

* * * * *